US010696135B2

United States Patent
Ceperkovic et al.

(10) Patent No.: US 10,696,135 B2
(45) Date of Patent: Jun. 30, 2020

(54) HVAC SYSTEM OF THE VEHICLE PASSENGER COMPARTMENT WITH AIR FLOW TOPOLOGY ALTERATION

(71) Applicant: Privredno Drustvo za Pruzanje Usluga iz Oblasti Automatike i Programiranja Synchrotek D.o.o., Belgrade (RS)

(72) Inventors: Vladimir Ceperkovic, Belgrade (RS); Nikola Bulatovic, Belgrade (RS)

( * ) Notice: Subject to any disclaimer, the term of this patent is extended or adjusted under 35 U.S.C. 154(b) by 125 days.

(21) Appl. No.: 15/566,218

(22) PCT Filed: Apr. 21, 2016

(86) PCT No.: PCT/RS2016/000009
§ 371 (c)(1),
(2) Date: Oct. 13, 2017

(87) PCT Pub. No.: WO2016/171577
PCT Pub. Date: Oct. 27, 2016

(65) Prior Publication Data
US 2018/0093548 A1    Apr. 5, 2018

(30) Foreign Application Priority Data

Apr. 22, 2015    (RS) .................................. P-2015/0271

(51) Int. Cl.
*B60H 1/00* (2006.01)
*B60H 1/32* (2006.01)
(Continued)

(52) U.S. Cl.
CPC ..... *B60H 1/00849* (2013.01); *B60H 1/00028* (2013.01); *B60H 1/00921* (2013.01);
(Continued)

(58) Field of Classification Search
CPC ............ B60H 1/00849; B60H 1/00028; B60H 1/00921; B60H 1/3213; B60H 1/323;
(Continued)

(56) References Cited

U.S. PATENT DOCUMENTS

| | | | | |
|---|---|---|---|---|
| 6,729,157 B2 * | 5/2004 | Oshitani | ............ | B60H 1/00885 62/324.2 |
| 9,649,908 B2 * | 5/2017 | Takeuchi | ................ | B60L 50/64 |

(Continued)

FOREIGN PATENT DOCUMENTS

| | | |
|---|---|---|
| EP | 2679419 A1 | 1/2014 |
| JP | H08236919 A | 9/1996 |

(Continued)

OTHER PUBLICATIONS

ISA: European Patent Office, NL; Sep. 29, 2016.

*Primary Examiner* — Nelson J Nieves
(74) *Attorney, Agent, or Firm* — Pathshegen IP LLC; Moshe Pinchas (57) ABSTRACT

The HVAC system of a vehicle passenger compartment with air flow alteration, which pertains to the system of air conditioning with several working modes for air conditioning of the passenger compartment, i.e. to the system that allows for cooling, heating, and dehumidifying of the space inside the vehicle passenger compartment, according to the present invention, comprises a refrigerant cycle which includes a compressor (1), heat exchanger (2) for heating, the first adjustable throttle valve (5), medium pressure heat exchanger (3), the second adjustable throttle valve (6), and an evaporator (4); and that comprises a subsystem (300) for altering the air flow topology inside which are placed the medium pressure heat exchanger (3) and the evaporator (4), a device (301) for additional heating inside which is placed the heat exchanger (2) for heating, external air flow which leads the air through the subsystem (300) for altering the (Continued)

topology of air flow into the environment, and the internal air flow that leads the air through the subsystem (300) for altering the air flow topology and the device (301) for additional heating into the passenger compartment; while the subsystem (300) for altering the air flow topology has at least two working modes, so that in the first working mode the external air flow includes the medium pressure heat exchanger (3), and the internal air flow includes the evaporator (4), whereas in the second working mode the external air flow includes the evaporator (4), and the internal air flow includes the medium pressure heat exchanger (3); and where the said system (300) realises at least one of the functions of heating, cooling, and dehumidifying of the passenger compartment air.

8 Claims, 7 Drawing Sheets

(51) Int. Cl.
  *B60H 1/03* (2006.01)
  *F25B 5/04* (2006.01)
  *F25B 41/06* (2006.01)
(52) U.S. Cl.
  CPC .............. *B60H 1/039* (2019.05); *B60H 1/323* (2013.01); *B60H 1/3213* (2013.01); *F25B 5/04* (2013.01); *F25B 41/062* (2013.01); *F25B 2341/066* (2013.01); *F25B 2600/2513* (2013.01)
(58) Field of Classification Search
  CPC ...... B60H 1/00064; B60H 2001/00942; B60H 2001/00949; B60H 2001/00121; B60H 2001/3289; B60H 1/00057; F25B 5/04
  See application file for complete search history.

(56) References Cited

U.S. PATENT DOCUMENTS

| | | | |
|---|---|---|---|
| 2005/0150237 A1* | 7/2005 | Yabu ..................... | F24F 3/1411 62/94 |
| 2007/0163277 A1* | 7/2007 | Tamura ................. | D06F 58/206 62/160 |
| 2008/0196446 A1* | 8/2008 | Nakamura ............... | F25B 5/04 62/498 |
| 2009/0229304 A1* | 9/2009 | Ogata ..................... | F25B 5/04 62/500 |
| 2013/0042637 A1* | 2/2013 | Richter .............. | B60H 1/00057 62/79 |
| 2014/0194048 A1* | 7/2014 | Wittmann ............ | B60H 1/0005 454/139 |
| 2014/0238058 A1* | 8/2014 | Wu ........................... | F25B 5/04 62/115 |
| 2014/0262132 A1* | 9/2014 | Connell ............. | B60H 1/00457 165/11.1 |
| 2015/0024669 A1* | 1/2015 | Gesell ................ | B60H 1/00849 454/75 |
| 2015/0082820 A1* | 3/2015 | Takahashi ............ | B60H 1/0005 62/238.7 |
| 2016/0009161 A1* | 1/2016 | Park ......................... | B60H 1/22 62/324.6 |
| 2016/0137023 A1* | 5/2016 | Park ................... | B60H 1/00057 165/202 |
| 2016/0229266 A1* | 8/2016 | Maeda ................. | B60H 1/0005 |

FOREIGN PATENT DOCUMENTS

| | | |
|---|---|---|
| WO | 2012/171601 A1 | 12/2012 |
| WO | 2013/105202 A1 | 7/2013 |

* cited by examiner

HVAC SYSTEM OF THE VEHICLE PASSENGER COMPARTMENT WITH AIR FLOW TOPOLOGY ALTERATION

TECHNICAL FIELD

The HVAC system of the vehicle passenger compartment with air flow topology alteration pertains to a system of air-conditioning with several working modes of air-conditioning of the passenger compartment, i.e. to a system that provides cooling, heating, and dehumidifying of the space within the passenger compartment, and belongs to devices for circulation of cooling means that use ducts, as well as the layout or installment of heating, cooling, or airing/refreshing devices in vehicle passenger compartments. Int. $Cl^8$.: B 60H 1/00 (2015.01); F 25B 29/00 (2015.01); F 25D 17/08 (2015.01)

TECHNOLOGY PROBLEM

The HVAC system of the vehicle passenger compartment with air flow topology alteration according to the invention is aimed at providing a novel HVAC system with a novel structure and layout of the system elements, which will simplify the system assembly so that it will not include any switching valves for topology alteration of the flow of the refrigerant, improving thus the overall efficiency and reliability of the system.

BACKGROUND ART

Heating, ventilation, and air-conditioning (HVAC) systems of the vehicle passenger compartment are known in which the internal heat exchanger (evaporator) and the heat exchanger for heating (condenser) are placed inside the internal air flow, with the heat exchanger for heating placed in the part of the flow located behind the internal heat exchanger.

The air stream of the internal air flow, which originates from the environment or the passenger compartment, or is obtained by mixing the two sources, is first cooled in the internal heat exchanger to dew point temperature in order to remove moisture from it. The divider of the air flow divides the air stream of the internal air flow into two air streams, of which one is heated on the heat exchanger for heating, while the other bypasses the heat exchanger for heating, and then the two air streams, passing through the flow collector, is introduced into the vehicle passenger compartment (cabin) as single stream: the air stream entering the cabin is a mixture of both air streams, the stream of heated air, as well as the air stream that bypasses the heat exchanger for heating. Therefore, the temperature of air entering the vehicle cabin can be controlled by altering the relative amount of heated air in the total air flow.

When the heating mode is selected as the working mode of the refrigerant cycle, the internal heat exchanger can also serve as a heat radiator, provided no air drying is required, i.e. when the temperature of the air coming into the internal air flow is below the dew point temperature. This implies that the air of the internal air flow is first pre-heated in the internal heat exchanger and then heated in the heat exchanger for heating.

When an HVAC system with multiple zones is desired, the internal air flow is, after the internal heat exchanger, divided into partial air flows, one for each required zone. Each of the partial air flows has its own air flow divider, which allows for independent control of the temperature of the air mix at the outlet of each partial air flow.

The stream of the external air flow, which always originates from the environment, exchanges heat in the external heat exchanger before returning to the environment. The external heat exchanger is integrated with the internal heat exchanger and the heat exchanger for heating, which allows for heat exchange between internal and external air flows.

The selection of the refrigerant cycle working mode is achieved by altering the topology of the refrigerant flow, by a suitable selection of switching valves positions. The choice of cooling mode as the working mode of the refrigerant cycle leads to discharge of the refrigerant from the compressor discharge outlet, and its' cycling through the heat exchanger for heating via the external heat exchanger, adjustable throttle valve (electronically controlled throttle valve), internal heat exchanger and accumulator back to the compressor. The choice of the heating mode as the working mode of the refrigerant cycle leads to discharge of the refrigerant from the compressor discharge outlet, and its' cycling through the heat exchanger for heating via the adjustable throttle valve (the second electronically controlled throttle valve), external heat exchanger and accumulator back to the compressor.

An HVAC system can additionally be improved by collecting the excess heat from other devices in the vehicle, e.g. waste heat from the engine or electronic devices. The HVAC refrigerant cycle is then thermally connected with the cooling system of the device by introducing an internal heat exchanger for collecting the waste heat. The additional branch of the refrigerant flow is introduced into the refrigerant cycle from the internal heat exchanger via the second adjustable throttle valve, internal heat exchanger for collecting the waste heat to the accumulator. The presence of the additional branch of the refrigerant flow is an advantage in both working modes of the refrigerant cycle, because it allows for collecting additional heat into the HVAC system when needed, but also allows for using the HVAC system to facilitate cooling of the devices in the vehicle.

The refrigerant cycle is described in the USA patent specification U.S. Pat. No. 7,121,103 B2 2006.10.17 VEHICLE AIR CONDITIONING SYSTEM of the Japanese company Denso Corporation discloses an example of a HVAC system in which the selection of the working mode (heating, cooling or dehumidifying) is achieved by altering the topology of the refrigerant flow, which is achieved by using several switching and adjustable throttle valves.

Such structure limits the efficiency due to unavoidable losses during the refrigerant flow through an open switching valve, and the large number of active components reduces the reliability of the system. Besides, this system cannot be used for air dehumidification when external temperature is below 0° C., since the evaporator is at the same pressure as the external heat exchanger, and such use would lead to its freezing. The known solutions to this problem further add to the complexity of the system by adding a larger number of switching and adjustable throttle valves, so as to allow for division of working pressures of the evaporator and the external heat exchanger. An additional problem is also the change in the working mode from cooling to heating, due to possible fogging of the windshield if the water from the internal air flow condenses on the internal heat exchanger in the cooling mode.

The efficiency is especially limited when fresh air from the environment is the source of the internal air stream, since in that case it is necessary to release the already conditioned air from the passenger compartment into the environment.

Known solutions to this problem include a recycling heat exchanger integrated into the refrigerant cycle that enables recovery of the heat from the air stream that leaves the vehicle passenger compartment. Unfortunately, great complexity of such solutions does not justify the small gains in efficiency, so they are not applied in practice. Additionally, such solutions are applicable only in the heating mode, whereas in the cooling mode the gained increase in efficiency would be nullified by losses on the additional elements of the refrigerant cycle needed for the realisation of these solutions.

In a disclosed patent specification U.S. 2013/0042637 A1 2013.02.21 MODULAR AIR CONDITIONING SYSTEM WITH HEAT PUMP FUNCTIONALITY by Visteon Global Technologies Inc. an HVAC system without alteration of refrigerant flow topology is described. The air streams of the internal and external air flows are obtained by mixing the warm air stream, heated on the heat exchanger for heating, and a cool air stream cooled on the heat exchanger for cooling. Temperatures and mass flows of air in the internal and external air stream can independently be adjusted by changing the ratio of the mass flows of warm and cool air stream, which indirectly also changes the working mode.

Although this system has a very simple refrigerant cycle, a great number of regulation flaps for control is needed, so that the overall complexity of the system remains high. The complexity is also negatively affected by the required use of advanced techniques of automatic control, as well as a significant number of sensors.

A particular disadvantage of this system is apparent when it is requested to work in the dehumidifying mode, which is a necessary working mode whenever the quality of air in the environment is unsatisfactory. In that case there is no air stream that brings the air from the environment to the heat exchanger, so that it is not possible to use the environment as a heat source or sink. It is therefore impossible to cool the air in the passenger compartment, whereas air heating is possible only with an additional source of heat, thereby significantly reducing the efficiency of the system.

An additional disadvantage of this system is that it does not allow for changing the working mode from the cooling or dehumidifying mode into the heating mode when the external temperature is below 0° C. The reason is that in the cooling and dehumidifying modes the condensed water collects at the heat exchanger for cooling. The change of the working mode into the heating mode would bring the cold external air into contact with condensed water, which may lead to formation of ice on the heat exchanger for cooling, causing thus a breakdown in system function, or its permanent damage.

DISCLOSURE OF THE INVENTION

The mentioned disadvantages of the HVAC system in which the alteration of the working mode is achieved by changing the topology of the refrigerant flow, as well as the disadvantages of the HVAC system in which this alteration is achieved by changing the mass ratios of warm and cool air streams are eliminated by the proposed system, in which the alteration in the working mode is achieved by changing the topology of the internal and external air flows.

In the first embodiment according to the present invention, an HVAC system for the vehicle passenger compartment includes a flaps for altering the topology of air flows, a medium pressure heat exchanger, evaporator, additional heating device, compressor for compressing and propelling the refrigerant, and a refrigerant cycle that connects the compressor, medium pressure heat exchanger, and the evaporator into entirety. The selection of the working mode of the HVAC system is achieved by selecting the position of the flaps for altering the topology of air flows.

When the cooling mode is selected as the working mode of the HVAC system, the flaps for altering the air flow topology direct the air stream of the external air flow onto the medium pressure heat exchanger, which allows for disposing of excess heat from the refrigerant cycle into the environment. At the same time, the air stream of the internal air flow is conducted over the evaporator and the additional heating device into the vehicle passenger compartment. The air stream of the internal air flow is first cooled on the evaporator to the dew point temperature in order to remove moisture, and then additionally heated to the desired temperature in the additional heating device, before it is introduced into the vehicle passenger compartment.

When the heating mode is selected as the working mode of the HVAC system, the flaps subsystem for altering the air flow topology directs the stream of external air to the evaporator, which allows for the heat from the environment to be introduced into the refrigerant cycle. At the same time, the air stream of internal air flow is directed over the medium pressure heat exchanger and the additional heating device into the vehicle passenger compartment. The air stream of the internal air flow is first cooled on the medium pressure heat exchanger to the dew point temperature, in order to remove moisture, and then additionally heated to the desired temperature in the additional heating device, before it is introduced into the vehicle passenger compartment.

In a second embodiment according to the present invention, the additional heating device includes a heat exchanger for heating integrated into entirety with the refrigerant cycle. The internal air flow is divided into a plurality of zone air flows, one for each conditioning zone. The air stream of the zone air flow is divided into two air streams by a temperature regulation flaps, of which the first air stream is heated on the heat exchanger for heating, while the other bypasses the heat exchanger for heating, and then the two streams of air, passing through flow collectors, enter the zone of the vehicle passenger compartment as single air stream. The temperature of the air stream that enters the vehicle passenger compartment can be controlled by altering the relative amount of the heated air stream in the total air flow via the temperature regulation flaps.

In a third embodiment according to the present invention, the refrigerant cycle includes the compressor for compressing and propelling the refrigerant, the first adjustable throttle valve for reducing the flow of the refrigerant sourced from the heat exchanger for heating, the second adjustable throttle valve for reducing the refrigerant flow sourced from the medium pressure heat exchanger, and the evaporator. The refrigerant, being discharged from the discharge outlet of the compressor, flows through the heat exchanger for heating, the first adjustable throttle valve, the medium pressure heat exchanger, the second adjustable throttle valve, and the evaporator to the suction inlet of the compressor.

The topology of the said refrigerant flow is unchangeable, and does not depend on the working mode, which allows for the realisation without switching valves and losses that they introduce. The pressures of the refrigerant in the heat exchanger for heating, medium pressure heat exchanger, and the evaporator are all independent, and can thus be controlled via the input power of the compressor, by the openness of the first throttle valve and the openness of the second throttle valve, and therefore this refrigerant cycle meets the requirements for connecting the compressor, heat exchanger for heating, medium pressure heat exchanger and the evaporator into entirety.

The said embodiment of the HVAC system of the passenger compartment provides that the external and internal air flows are always separated, which allows for the realisation of all working modes, independent of the external temperature and the internal air flows' air stream source selection. The sub-system of flaps for the exchange of air flows has only two discrete states which, coupled with a simple refrigerant cycle free of switching elements, allows for the use of a simple control system.

In a fourth embodiment according to the present invention, the air that leaves the vehicle passenger compartment is directed onto the first access to the internal heat exchanger, before emission into the environment. At the same time, the second access to the internal heat exchanger is placed in an air flow that includes the medium pressure heat exchanger.

When the heating mode is selected as the working mode of the HVAC system, the air stream of the internal air flow is directed over the medium pressure heat exchanger, internal heat exchanger, and the additional heating device into the vehicle passenger compartment. Accordingly, the air stream of the internal air flow is first additionally heated via the internal heat exchanger by using the heat that would otherwise be dissipated into the environment, which improves the system efficiency.

When the cooling mode is selected as the working mode of the HVAC system, the air stream of the external air flow is directed over the internal heat exchanger and the medium pressure heat exchanger. Accordingly, the air stream of the external air flow is first cooled via the internal heat exchanger by using the cool air that exits the vehicle passenger compartment into the environment, which improves the system efficiency.

In a fifth embodiment according to the present invention the air that exits the vehicle passenger compartment is directed to the first access of the internal heat exchanger, before it is released into the environment. At the same time, the stream of fresh air exits the environment and is divided on the flow divider into the first partial stream of fresh air that is directed onto the second access of the internal heat exchanger, and the second partial stream of fresh air that bypasses the internal heat exchanger, after which two partial streams of fresh air, by passing through the flow collector, are introduced into at least one air flow of the HVAC system as single stream. This enables for the heat from the air leaving the vehicle passenger compartment into the environment to be recovered, without changing the direction of the air flow through the medium pressure heat exchanger and the evaporator.

The flow divider of the external air stream allows for limiting the heat exchange on the internal heat exchanger. The limiting is required when the external temperature is below 0° C., to prevent freezing of the condensed water from the air leaving the passenger compartment. The flow divider can be removed, so that the entire stream of fresh air passes through the internal heat exchanger, if the freezing of the condensed water is avoided by design characteristics of the internal heat exchanger.

BRIEF DESCRIPTION OF DRAWINGS

The HVAC system of the vehicle passenger compartment with air flow topology alteration according to the present invention is presented in the attached figures in which.

BEST MODE FOR CARRYING OUT OF THE INVENTION

Further description of preferred embodiments of the invention shown in the attached figures is primarily of illustrative nature and has no intention to limit the scope of the invention, its use or application.

REFERENCE LABELS USED IN THE DRAWINGS

Figure 1:
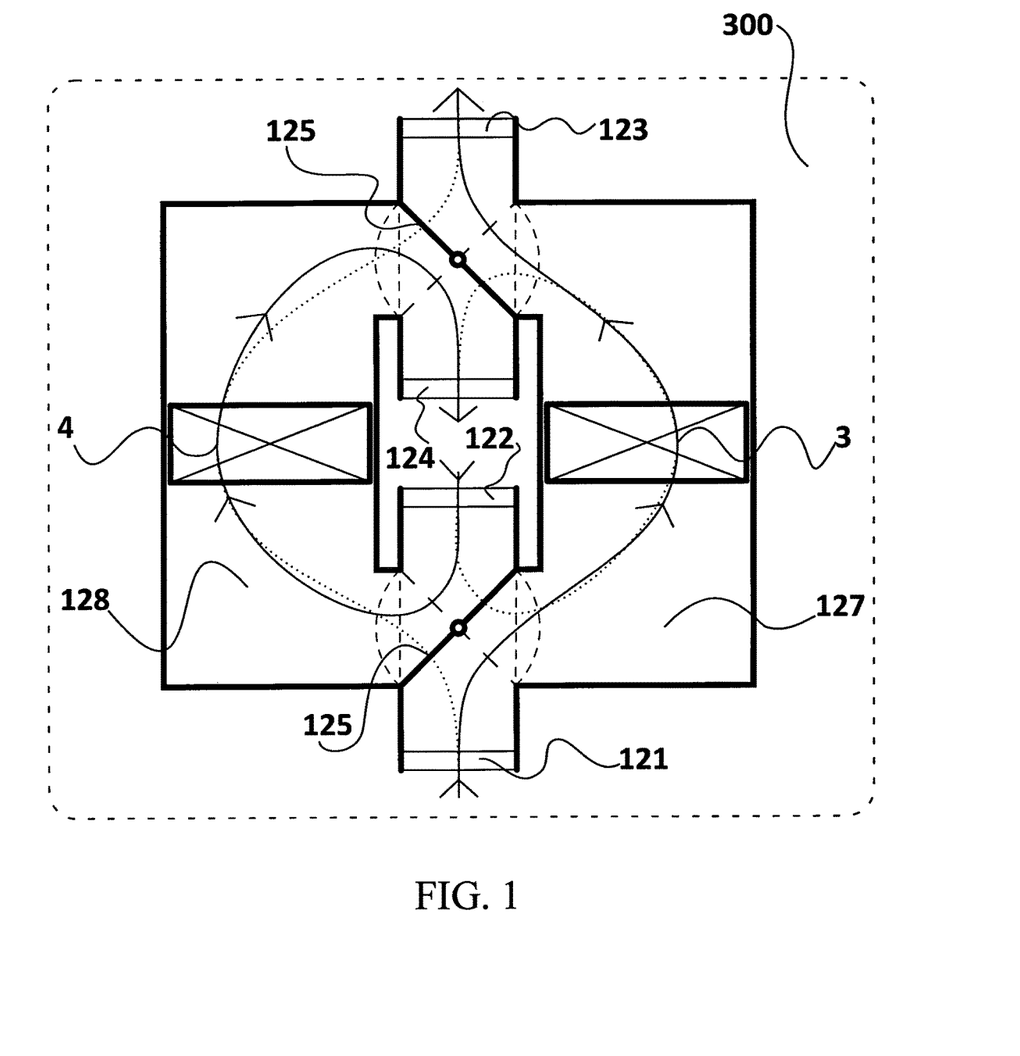
FIG. 1 presents a schematic of the system of flaps for altering the topology of air flow according to the first embodiment of the said invention.

1—Compressor
2—Heat exchanger for heating
3—Medium pressure heat exchanger
4—Evaporator
5—The first adjustable throttle valve
6—The second adjustable throttle valve
7—Heat exchanger for the collected waste heat from electrical or mechanical assemblies
8—The first additional adjustable throttle valve
9—The second additional adjustable throttle valve
10—Internal heat exchanger
11—Heat exchanger
200, 201, . . . 20n, . . . —Temperature regulation flaps
121—Inlet of the internal air flow
122—Inlet of the external air flow
123—Outlet of the internal air flow
124—Outlet of the external air flow
125—Flaps for altering the air flow topology
127—Air chamber of the medium pressure heat exchanger
128—Air chamber of the evaporator
129—Inlet of air from the passenger compartment
130—Inlet of external air
131—Regulation opening for mixing the external air and passenger compartment air
132—Outlet of air into the environment
133—Adjustable flow divider
300—Subsystem for air flow altering
301—Additional heating device
302—Subsystem for air quality
400, 401, . . . 40n . . . Ventilation opening of the conditioning zone FIG. 1 presents a block diagram of the subsystem 300 for altering the air flow topology, which includes the medium pressure heat 3 exchanger placed in the air chamber 127 of the medium pressure heat exchanger 3, evaporator 4 placed into the air chamber 128 of the evaporator, and the flaps 125 for altering the air flow topology which can be put into two different positions. The internal air flow includes the subsystem for altering the air flow topology so that the air stream of the internal air flow enters the inlet 121 of the internal air stream, and exits through the outlet 123 of the internal air flow. Similarly, the external air flow constitutes the subsystem for altering the air flow topology so that the air stream of the external air flow enters the inlet 122 of the external air flow, and exits through the outlet 124 of the external air flow.

When the flaps 125 for altering the air flow topology is placed in the first position, the air stream of the internal air flow enters the inlet 121 of the internal air flow, and is directed via the flaps 125 for altering the air flow topology through the air chamber 127 of the medium pressure heat exchanger 3, and the medium pressure heat exchanger 3, to the outlet 123 of the internal air flow. At the same time, the air stream of the external air flow enters the inlet 122 of the external air flow, and is directed by the flaps 125 for altering the air flow topology through the air chamber 128 of the evaporator 4, and over the evaporator 4, to the outlet 124 of the external air flow.

In the second position (shown by a dashed line) the flaps 125 for altering the air flow topology, the air stream of the external air flow enters the inlet 122 of the external air flow, and is directed by the flaps 125 for altering the air flow topology, air stream of the external air flow through the air chamber 127 of the medium pressure heat exchanger 3, and over the medium pressure heat exchanger 3 to the outlet 124 of the external air flow. At the same time, the air stream of the internal air flow enters the inlet of the internal air flow 121, and is directed by the flaps for altering the air flow topology 125 through the air chamber 128 of the evaporator 4, and over the evaporator 4, to the outlet 123 of the internal air flow.

By such design, the subsystem 300 for altering the air flow topology allows for the internal and external air flows to always be separated independent of the position of the flaps 125 for altering the air flow topology, and for the simultaneous existence of thermal coupling between the internal and external air flows realised via the refrigerant cycle that includes a medium pressure heat exchanger 3 and evaporator 4.

Figure 2:
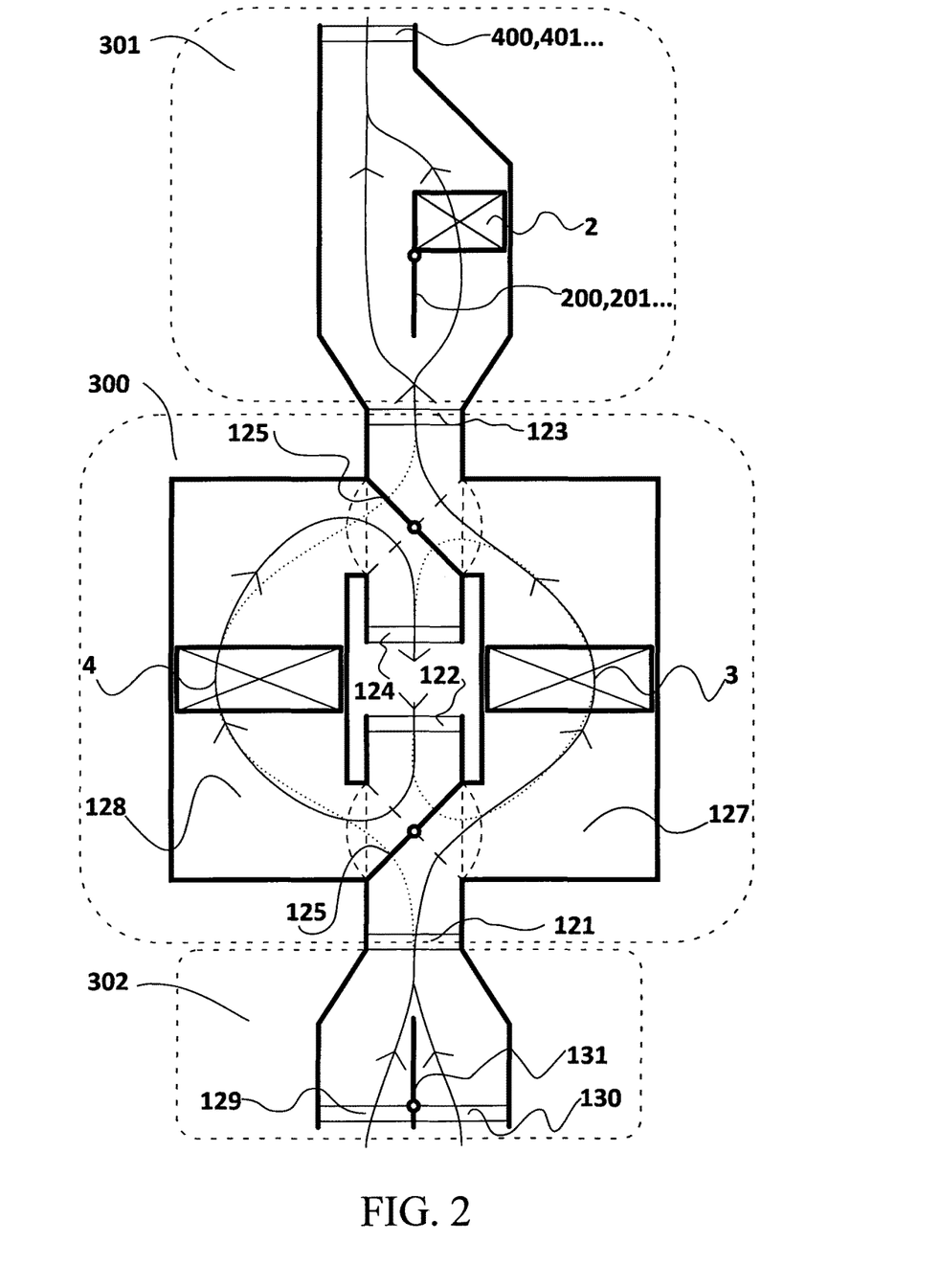
FIG. 2 presents a schematic of the HVAC system according to the second embodiment of the said invention.

FIG. 2 presents the second embodiment of the said invention, which additionally includes a device 301 for additional heating connected with the subsystem 300 for altering air flow topology via the outlet 123 of the internal air stream and a subsystem 302 for air quality which is connected with the subsystem 300 for altering air flow topology which is connected with the system 300 for altering air flow topology via the inlet 121 of the internal air flow.

The device 301 for additional heating includes a heat exchanger 2 for heating, and temperature regulation flaps 200, 201, . . . 20n. The internal air flow is divided into a plurality of zone air flows, one for each conditioning zone. The air stream of an air flow zone is by a corresponding temperature regulation flap 20x (where x=0, 1, 2 etc. n) divided into two air streams, of which the first air stream is heated on the heat exchanger 2 for heating, while the other bypasses the heat exchanger 2 for heating, and then the mixture of these two air streams is directed into the vehicle passenger compartment through the ventilation opening 40x (where x=0, 1, 2 etc. n) of the conditioning zone. By this, the device 301 for additional heating allows for controlling the temperature of the air stream that enters the vehicle passenger compartment zone by altering the relative amount of the heated air stream in the total air flow.

The subsystem 302 for air quality includes a regulation opening 131 for mixing the external air entering the inlet 130 of the external air, and the air from the passenger compartment entering the inlet 129 of the air from the passenger compartment, by which this subsystem allows for the choice of source of the air stream of the internal air flow.

Figure 3:
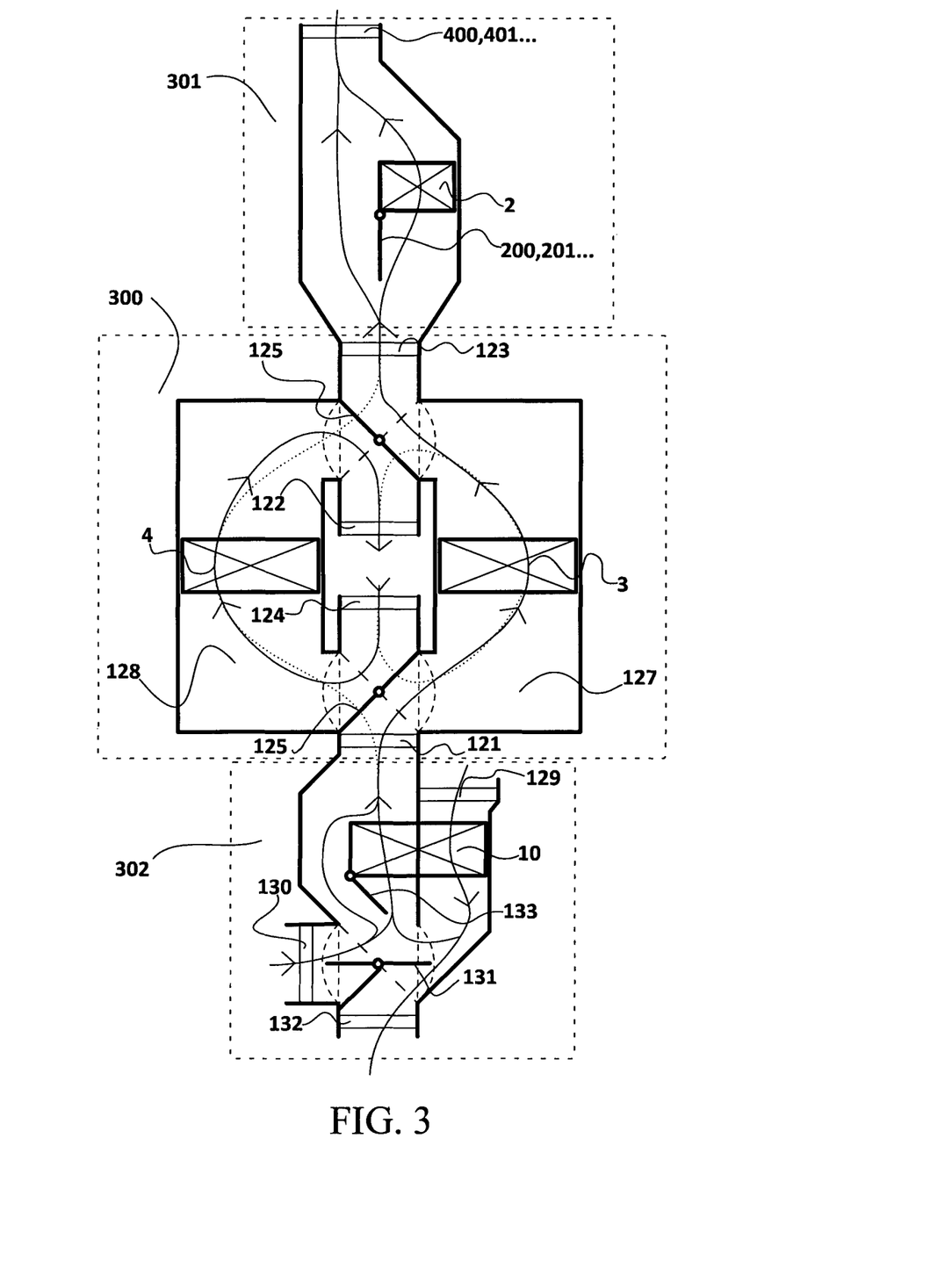
FIG. 3 presents a schematic of the HVAC system according to the third embodiment of the said invention.

FIG. 3 presents the third embodiment of the said invention, which also includes the device 301 for additional heating that includes the heat exchanger 2 for heating, and temperature regulation flaps 200, 201, . . . 20n, whose function is described with the embodiment shown in FIG. 2, but in this third embodiment the subsystem 302 for air quality additionally includes an internal heat exchanger 10. The air entering from the passenger compartment exchanges heat on the first access of the internal heat exchanger 10, and on the regulation opening 131 it is mixed with external air entering the external air inlet 130. By choosing the position of the regulatory opening 131 the choice is made of the source of internal air flow between external air, air entering from the passenger compartment via the heat exchanger 10, or any mixture of the two. The adjustable flow divider 133 divides the obtained mixture into two air streams, of which the first air stream exchanges heat at the second access of the internal heat exchanger 10, and is mixed with the second air stream, before it is introduced into the subsystem 300 for altering air flow topology via the inlet 121 of the internal air flow. This enables the heat transfer from the air leaving the vehicle passenger compartment to the internal air stream via the internal heat exchanger 10, independently of the position of the regulation opening 131, thus achieving greater efficiency of the system. At the same time, the adjustable flow divider 133 allows for the adjustment of the working point of the internal heat exchanger 10 in order to avoid ice formation.

Figure 4:
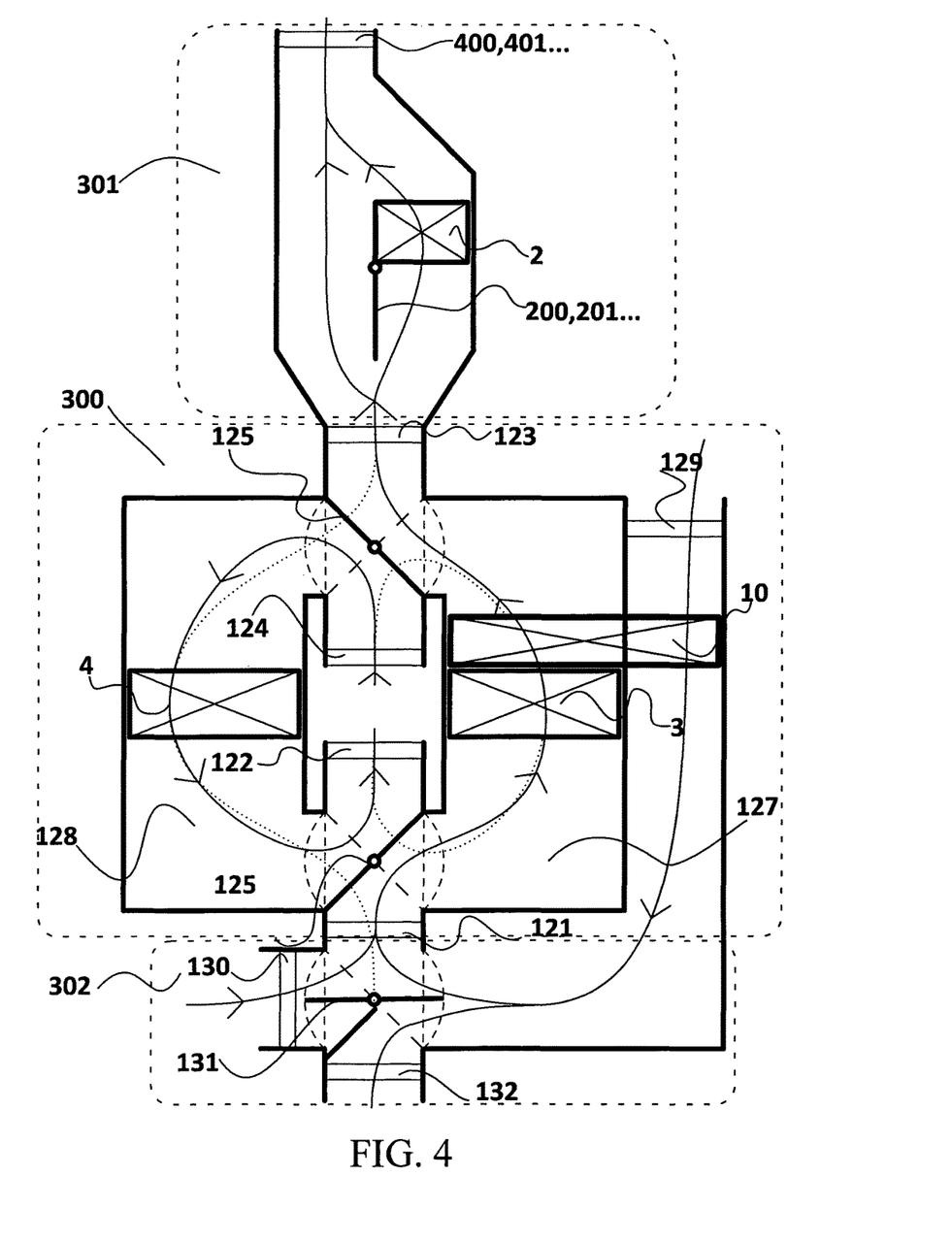
FIG. 4 presents a schematic of the HVAC system according to the fourth embodiment of the said invention.

FIG. 4 presents the fourth embodiment of the said invention, where the second access of the internal heat exchanger 10 is placed in the subsystem 300 for altering air flow topology, inside the air chamber 127 of the medium pressure exchanger. When the flaps 125 for altering air flow topology is placed in the position in which the air chamber 127 of the medium pressure exchanger 3 is included in the internal air flow, the air stream of the internal air flow first exchanges heat at the medium pressure exchanger 3, and then exchanges heat at the internal heat exchanger 10. Opposite to this, when the flaps 125 for altering air flow topology is placed in the position in which the air chamber 127 of the medium pressure heat exchanger 3 is included in the external air flow, the air stream of the external air flow first exchanges heat at the internal heat exchanger 10, and then exchanges heat on the medium pressure heat exchanger 3. Although this solution has a slightly lower efficiency than the third embodiment of the present invention, the system does not include an adjustable flow divider 133, and is therefore simpler.

Figure 5:
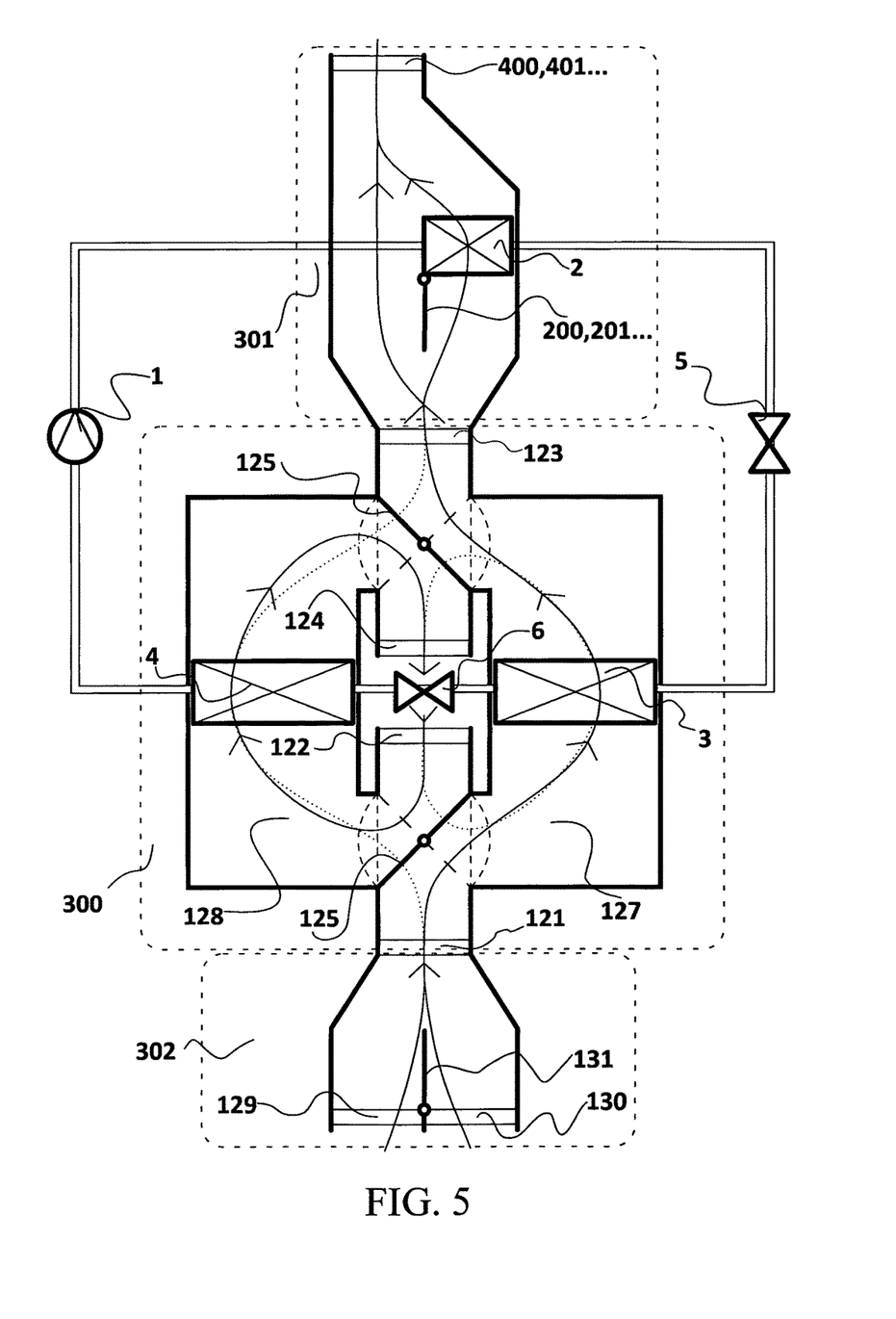
FIG. 5 presents a schematic of the HVAC system according to the fifth embodiment of the said invention.

FIG. 5 presents the fifth embodiment of the said invention. The compressor 1 compresses and propels the refrigerant which flows through the heat exchanger 2 for heating, the first adjustable throttle valve 5 which relieves the pressure of the refrigerant, the medium pressure heat exchanger 3, and the second adjustable throttle valve 6 which reduces the flow of the refrigerant through the evaporator 4. This forms a refrigerant cycle with permanent topology of the refrigerant flow, which connects the heat exchanger 2 for heating, the medium pressure heat exchanger 3 and evaporator 4.

When the flaps 125 for altering the air flow topology is placed in the position in which the air chamber of the medium pressure exchanger 127 is included in the internal air flow, the air stream of the internal air flow is cooled, dehumidified or heated on the medium pressure heat exchanger 3, in order to be additionally heated in the additional heating device 301, where it receives the heat from the heat exchanger 2 for heating. At the same time, the air stream of the external air flow delivers heat to the refrigerant cycle at the evaporator 4. Accordingly, the system realises the function of heating and/or dehumidifying.

When the flaps 125 for altering the air flow topology is placed in the position in which the air chamber 128 of the evaporator is included in the internal air flow, the air stream of the internal air flow is cooled, on the evaporator 4, and additionally heated in the additional heating device 301, where it receives the heat from the heat exchanger 2 for heating. At the same time, the air stream of the external air flow receives the heat from the refrigerant cycle in the medium pressure heat exchanger 3. Accordingly, the system realises the function of cooling.

Figure 6:
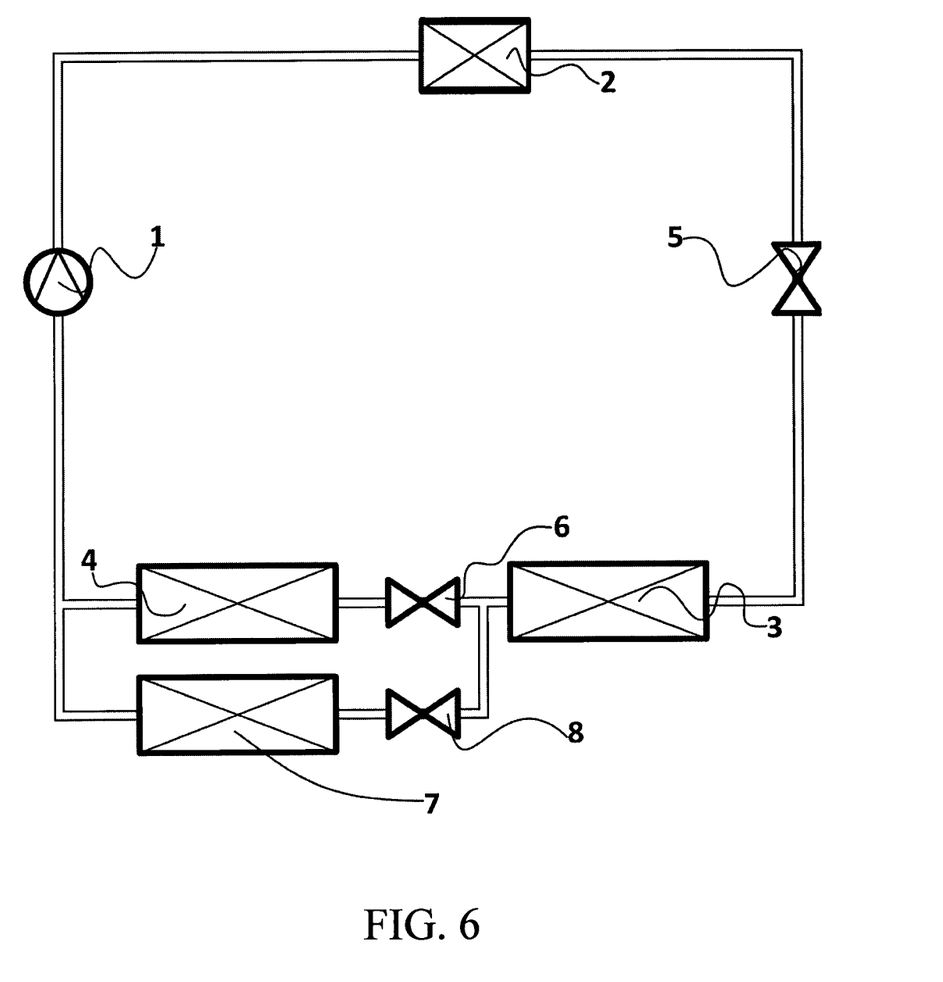
FIG. 6 presents a schematic of the HVAC system according to the sixth embodiment of the said invention.

FIG. 6 presents a sixth embodiment of the said invention. The refrigerant cycle additionally includes a heat exchanger for collecting waste heat from electrical or mechanical assemblies 7, with associated first additional throttle valve 8. Accordingly, collection of waste heat is enabled in the refrigerant cycle from electrical or mechanical assemblies, and their cooling, without introducing additional switching valves. Cooling the assemblies is achieved independently of the working mode of the HVAC system.

Figure 7:
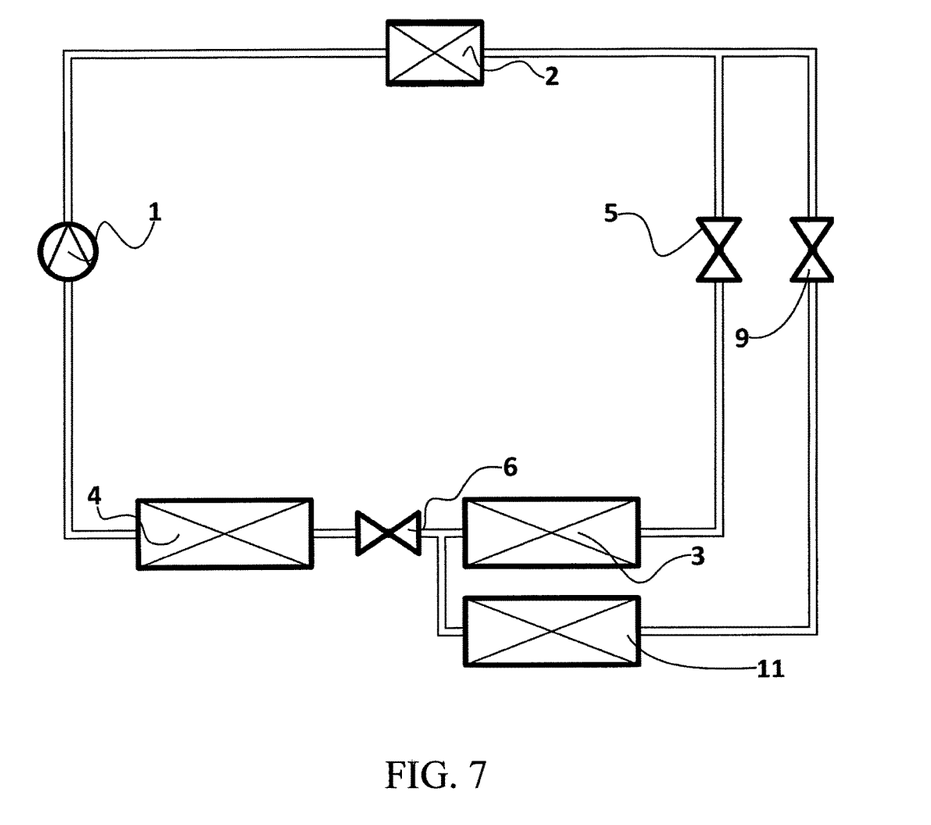
FIG. 7 presents a schematic of the HVAC system according to the seventh embodiment of the said invention.

FIG. 7 presents a seventh embodiment of the said invention. The refrigerant cycle additionally includes a heat exchanger 11, with associated second throttle valve 9. The air that exits the passenger compartment into the environment exchanges heat with the refrigerant cycle on the heat exchanger 11, so that the heat is transferred from the refrigerant cycle when the HVAC system realises the function of cooling. Opposite to this, when the HVAC system realises the function of heating, the heat is transferred, from the air leaving the passenger compartment into the environment, into the refrigerant cycle at the heat exchanger 11. Accordingly, the system provides the heat recovery from the air leaving the vehicle passenger compartment, independently of the HVAC system working mode.

The invention claimed is:

1. A HVAC system of a vehicle passenger compartment with air flow alteration, which pertains to a air conditioning system for air conditioning of the passenger compartment, where the air conditioning system includes a compressor (1), first adjustable throttle valve (5), second adjustable throttle valve (6); wherein the HVAC system comprising a subsystem (300) for altering air flow topology including a first air chamber having a first heat exchanger (3) and a second air chamber having an evaporator (4), said subsystem (300) further includes external air inlet, external air outlet, internal air inlet and internal air outlet, said subsystem (300) further includes a first and second flaps configured to alternate between first and second position configured such that in said first position external air flow from said external air inlet is directed through said first air chamber towards said external air outlet, and internal air flow from said internal air inlet is directed through said second air chamber towards said internal air outlet and such that in said second position external air flow from said external air inlet is directed through said second air chamber towards said external air outlet, and internal air flow from said internal air inlet is directed through said first air chamber towards said internal air outlet.

2. The HVAC system according to claim 1, further comprising an additional heating device (301) being in fluid communication with said external air outlet; said additional heating device having a second heat exchanger (2) for heating said external air flow; said additional heating device (301) includes a plurality of ventilation openings (400, 401, . . . 40n) configured to divided said external air flow into a plurality of partial air flows, each of which being directed to a separate zone of the passenger compartment.

3. The HVAC system according to claim 2, wherein the second heating device (301) is configured to divide said external air flow into two parts, so that a first part of the external air flow is heated in the second heat exchanger (2) for heating, and then mixed with a second part of the external air flow.

4. The HVAC system according to claim 1, further comprising an internal heat exchanger (10) disposed with respect to said subsystem such that at least part of air flow from the passenger compartment flows therethrough towards least one of the internal air flow and the external air flow.

5. The HVAC system according to claim 4, wherein a portion of said internal heat exchanger (10) is disposed inside said first chamber.

6. The HVAC system according to claim 2, configured such that wherein during refrigerant cycle refrigerant discharged from a discharge outlet of the compressor (1) flows through the second heat exchanger (2) to a first adjustable throttle device-valve (5) and then over the heat exchanger (3), and a second adjustable throttle device-valve (6) and the evaporator (4) to a suction inlet of the compressor (1).

7. The HVAC system according to claim 6, having a refrigerant line having an additional adjustable throttle device-valve (8) and a third heat exchanger (7) and wherein a portion of the refrigerant flowing through said associated heat exchanger is directed towards the refrigerant line.

8. The HVAC system according to claim 6, characterized by that the refrigerant from the discharge outlet of the compressor (1) is lead through the second heat exchanger (2) towards a divider in which the refrigerant is divided to a first path having said first adjustable throttle device-valve (5) connected to the first heat exchanger (3) and and a first path having said second additional adjustable throttle device-valve (9) wherein said second path is connected to an exit of the first heat exchanger (3).

* * * * *